(12) United States Patent
Nubling

(10) Patent No.: US 9,022,290 B2
(45) Date of Patent: May 5, 2015

(54) ILLUMINATION APPARATUS AND METHOD FOR GENERATING AN ILLUMINATED REGION

(71) Applicant: Sick AG, Waldkirch (DE)

(72) Inventor: Ralf Nubling, Waldkirch (DE)

(73) Assignee: Sick AG, Waldkirch (DE)

( * ) Notice: Subject to any disclaimer, the term of this patent is extended or adjusted under 35 U.S.C. 154(b) by 33 days.

(21) Appl. No.: 13/870,520

(22) Filed: Apr. 25, 2013

(65) Prior Publication Data
US 2013/0284808 A1 Oct. 31, 2013

(30) Foreign Application Priority Data

Apr. 27, 2012 (EP) .................................... 12165915

(51) Int. Cl.
*G06K 7/10* (2006.01)
*F21V 14/06* (2006.01)

(52) U.S. Cl.
CPC ........ *G06K 7/10831* (2013.01); *G06K 7/10702* (2013.01); *G06K 7/10811* (2013.01); *F21V 14/06* (2013.01)

(58) Field of Classification Search
CPC ............ G06K 7/10722; G06K 7/1032; G06K 7/10712
USPC .................. 235/454, 462.01, 462.11, 462.22, 235/462.24, 462.41, 462.42
See application file for complete search history.

(56) References Cited

U.S. PATENT DOCUMENTS

| | | | | |
|---|---|---|---|---|
| 6,889,903 | B1* | 5/2005 | Koenck .................... | 235/462.01 |
| 7,229,021 | B2* | 6/2007 | Vesikivi et al. .......... | 235/462.01 |
| 2004/0035931 | A1* | 2/2004 | Matsuura et al. .............. | 235/454 |
| 2005/0269411 | A1* | 12/2005 | Vesikivi et al. .......... | 235/462.01 |
| 2007/0205283 | A1* | 9/2007 | Vesikivi et al. ................ | 235/451 |
| 2007/0213586 | A1* | 9/2007 | Hirose et al. .................. | 600/112 |
| 2009/0091735 | A1* | 4/2009 | Orino ............................. | 355/67 |
| 2009/0251671 | A1* | 10/2009 | Fujiwara et al. ............... | 353/101 |
| 2010/0021151 | A1* | 1/2010 | Nubling et al. ................. | 396/61 |

FOREIGN PATENT DOCUMENTS

| | | |
|---|---|---|
| DE | 69630997 T2 | 10/2004 |
| EP | 0 757 270 A1 | 2/1997 |

(Continued)

OTHER PUBLICATIONS

European Search Report dated Sep. 19, 2012, from corresponding application EP 12165915.5.

*Primary Examiner* — Paultep Savusdiphol
(74) *Attorney, Agent, or Firm* — Nath Goldberg & Meyer; Jerald L. Meyer; Tiffany A. Johnson

(57) ABSTRACT

An illumination apparatus (10) for the generation of an illuminated region for a camera-based code reader (100) is provided which comprises at least one light transmitter (12), an optical transmission system (14), a holder (24) for the optical transmission system (14) and a setting device (28), by means of which the holder (24) can be moved whereby the illuminated region can be focused at a working distance and/or be adapted in its dimensions. In this connection the holder (24) is fixed at at least one point of fixation (26) so that the holder (24) is moved relative to the light transmitter (12) in a compulsory guided manner on actuation of the setting device (28), however, maintains its relative position with respect to the light transmitter (12) at the point of fixation.

17 Claims, 4 Drawing Sheets

(56) References Cited

FOREIGN PATENT DOCUMENTS

Figure 1:
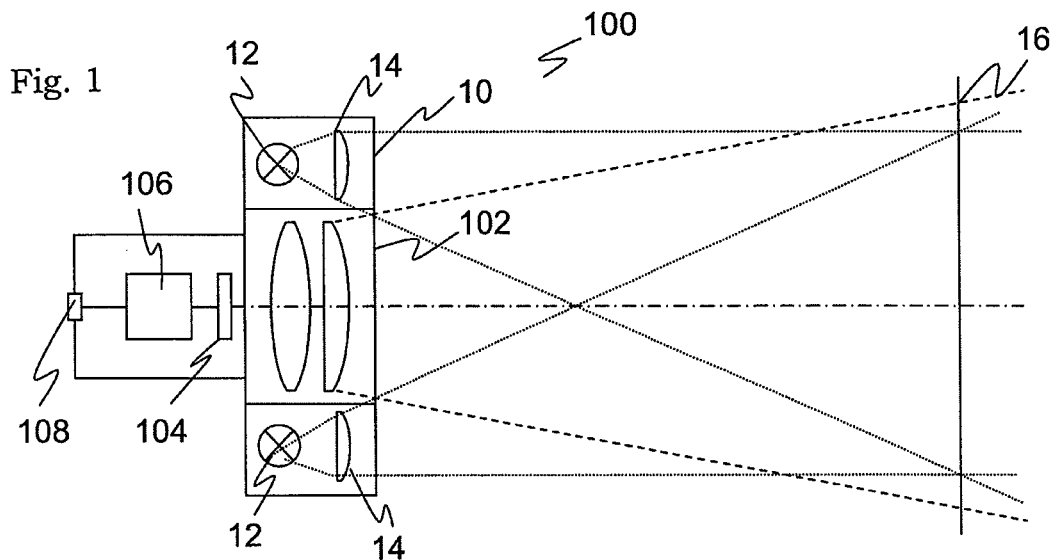

| EP | 0757270 | A1 | 2/1997 |
| EP | 2136248 | A1 | 12/2009 |
| EP | 2511852 | B1 | 3/2013 |
| JP | 2007-057296 | A | 3/2007 |
| JP | 2011-059973 | A | 3/2011 |

* cited by examiner

ILLUMINATION APPARATUS AND METHOD FOR GENERATING AN ILLUMINATED REGION

The invention relates to an illumination apparatus and to a method for generating an illuminated region for a camera-based code reader.

Camera-based code readers are increasingly being used for the reading of optical codes, such as bar codes or matrix code. In this connection an image of the code is taken and the code information is subsequently read out using digital image processing. In this connection, the code reader is frequently attached at a conveyor belt in a stationary manner in industrial applications, on which conveyor belt the articles bearing the codes are conveyed past the code reader. Otherwise, however, also hand held devices are known which are guided over the code to be read.

So that the reading field is sufficiently illuminated many of the cameras have an own illumination. This illumination can be integrated in compact camera systems and, for example, be configured as a ring light around the optical reception system. A fixed illumination has the effect for a large distance region that the illumination is generally only ideal at one distance, with generally a homogeneous energy distribution being desired. In all other regions, at least an adaptation with respect to, for example, field size or homogeneity, or the illumination is missing, or even completely useless.

A common solution consists therein to configure individual component groups such as the lenses of an optical transmission system of the illumination displaceable along the optical axis. Such displacement mechanisms are, however, frequently demanding in effort and cost, susceptible and cannot be automated or are too slow.

From the EP 2 136 248 A1 an image taking device is known having an adaptable illumination composed of a plurality of light sources. In this respect an adjustment of the focus of the optical reception system simultaneously brings about an adaptation of the illumination. However, a relatively large mass has to be moved in order to move the optical transmission system at the optical axis. In this way the illumination adaptation is demanding in effort and cost and comparatively sluggish.

In the not yet published European patent application having the file reference EP 11162584.4 a ring illumination for a code reader is disclosed in which a plurality of light lenses are arranged distributed around a circumference of a housing attachment. Through a rotation of the housing attachment in a thread the distance to the light sources of the illumination is varied. In this connection the lenses change their association to the respective light source, effectively a different, but like lens having a new distance is associated with each light source in this connection, so that the illumination is correspondingly focused. Also in this way the complete housing attachment and therefore a large mass has to be moved.

For this reason it is the object of the invention to enable a simple repositioning of the illumination field for a generic kind of illumination.

This object is satisfied by an illumination apparatus and a method for generating an illuminated region for a camera-based code reader. In this connection the solution starts from the basic idea of changing the relative position between a holder of the optical transmission system and the light transmitter for adaptation of the illumination with the aid of a setting device. However, in order to manage small movable masses and small changes in setting, the holder is fixed at at least one point of fixation. This point of fixation is, for example a connection of the holder to a housing part in which the light transmitter is present. In this way a compulsory guided position of the holder arises which holder maintains its position at the point fixation independent of the actuation of the setting device.

The invention has the advantage that a desired distribution of light, for example, a homogeneous distribution of light is ensured also over large distance regions. Thus, the illumination of an object to be detected alternatively of a reception unit of a camera can be repositioned. An adjustment can take place very quickly due to the simple movement of a low mass, even in the millisecond range and at a small influence of a force by a setting device of correspondingly simple design. In this connection, the illumination apparatus remains cost-effective and simply reproducible at a large number of units. An alignment is not required. An arbitrary amount of illumination scenarios are possible in which a large depth of field can be covered by an illumination. Since only the holder is moved an electronic card having the light transmitter can remain fixed, so that an excellent heat connection of the electronic card can be possible and movable cables can be avoided.

The setting device is preferably configured to move the holder along the optical axis of the light transmitter, wherein the optical transmission system can simultaneously be moved and/or tilted transverse to the optical axis during such a movement by the fixation at the point of fixation. Although the setting device only brings about a simple one-dimensional movement this effects a movement of the optical transmission system in two coordinates due to the point of fixation. A tilting can also arise in addition to the change of position which tilting can be well defined by the holder and its fixation and thus contribute to the adaptation of the illumination or even influence it significantly. It is also plausible that the setting device engages with a component transverse to the optical axis or even perpendicular to the optical axis. The point of fixation then also ensures that the optical transmission system is moved both along the optical axis and also transverse to the optical axis.

The optical transmission system is preferably configured in one piece with the holder. In this way no further mounting steps or alignment steps are required. A particularly simple preferred method of manufacture consists therein that the lenses or other optical elements are injected into the holder, which optical elements form the optical transmission system.

The holder is preferably configured as a plastic injection molded part or as sheet metal, in particular lens sheet metal. Thus, the holder can be manufactured easily in the desired geometry. It offers the required flexibility at the point of fixation on adjustment and permits the manufacture of the optical transmission system in one piece, in particular through the injection of lenses. Preferably tapered portions are provided at the support points and/or bending points.

The illumination apparatus preferably comprises a plurality of light transmitters, wherein the optical transmission system has a plurality of like lenses associated with the light transmitters, in particular lenses of equal design. In this connection a lens or an arrangement of a plurality of lenses thus belongs, for example, to each light transmitter.

The illumination apparatus is preferably configured as a ring illumination in which the light transmitter is distributed in a ring-like manner around the circumference of the illumination. Even more preferred the distribution is uniform. This simplifies the manufacture and a homogeneous illumination of the reading field of the code reader.

Preferably the holder is fixed at an outer circumferential region and is movable by the setting device in an inner region or vice versa. Thus, the setting device concentrically displaces the inner region of the holder and with respect to the elastic deformation of the holder against the fixed support at the outer region or vice versa.

In a preferred embodiment the holder is of star-like design and respectively has at least one optical element of the optical transmission system in the rays of the star (like in the spoke of a wheel). The rays bend on an actuation of the optical holder in order to place the optical elements or lenses into the desired position and orientation. The star-like holder is, in particular configured as a star-like lens sheet metal.

The holder preferably has at least one flexible part region which is elastically deformable through the actuation of the setting device. The flexible part region is thus something like an intended point of bending in order to avoid an uncontrolled deformation of the holder and to reliably place the optical transmission system into a desired state on actuation of the setting device.

Preferably, a respective flexible part region is provided centrally or laterally offset in the rays of the star. In this way the star-like holder is deformed in a very controlled manner on actuation of the setting device, so that a reliable setting of the optical transmission system and therefore of the illumination is possible.

The illumination apparatus preferably has at least two holders each having an optical transmission system. In this way also more demanding multi-part optical systems can be used for an adaptation of the illumination.

In this connection all mixed kinds of setting options of the holder are plausible, thus, for example, it is plausible that two holders each having an own setting device are provided, that a common setting device can act on both holders or that one holder is fixed and only the other holder can be varied in its settings by the setting device. It is also possible to provide an additional holder which is not fixed at the point of fixation, for example, in order to initially set a coarse working region of the illumination, within which working region the other holder fixed at a point of fixation then ensures a rapid adaptation.

The setting device preferably has a manual actuator or an electrically controllable actor. An example for a manual actuation is a rotary ring having a screw-like guide slot for the holder. Automatic actors comprise, for example, electro motors, moving coils or piezo-elements.

In a preferred embodiment of the invention a camera-based code reader comprises an illumination apparatus in accordance with the invention and further has an image sensor and an evaluation unit which are configured to read a code information of a recorded code from image data of the image sensor and to output the code information. Even at unfavorable environmental conditions the codes are thus uniformly and sufficiently illuminated and for this reason can be detected with particularly small reading errors.

The setting device preferably has a coupling to a focusing device for an optical reception system of the image sensor. In this connection the reception side lens movement is used for the adaptation of the focus of the image sensor as an actor for the illumination adaptation. Thus an actor can be saved. Furthermore, an ideal coordination between the transmitter design and the optical reception system is possible so that the focus of the image sensor and the illumination ideally suit one another generally independent of individual working distances to be set.

The method in accordance with the invention can be furthered in a similar manner and in this respect has similar advantages. Such advantageous features are described by way of example, but not conclusively in the dependent claims depending on the independent claims.

Figure 2:
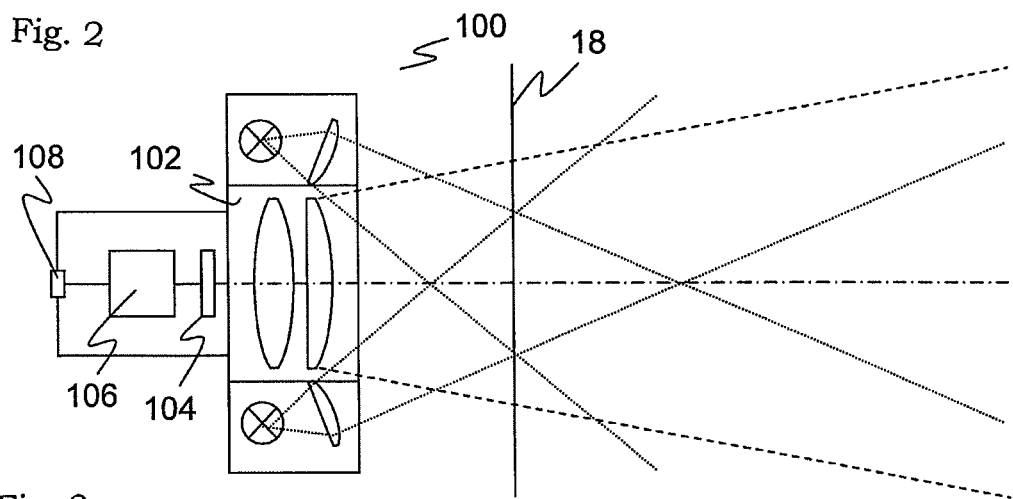
Figure 3:
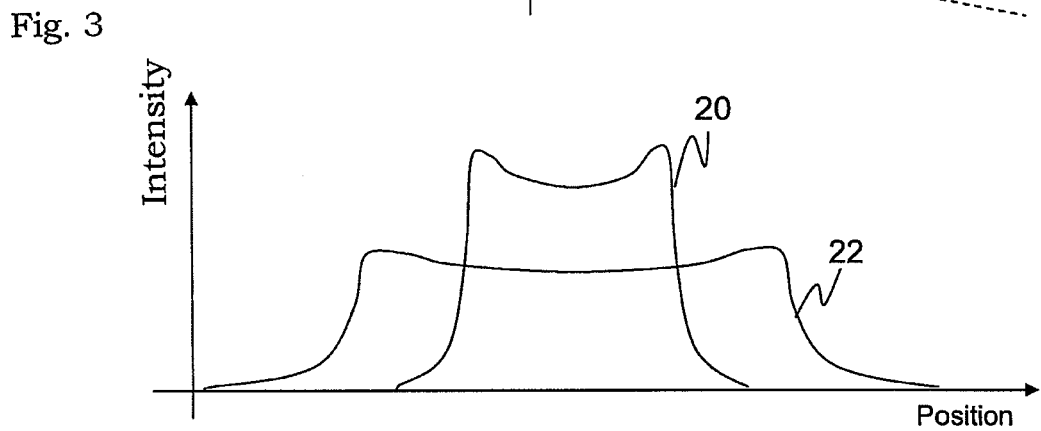
Figure 4A:
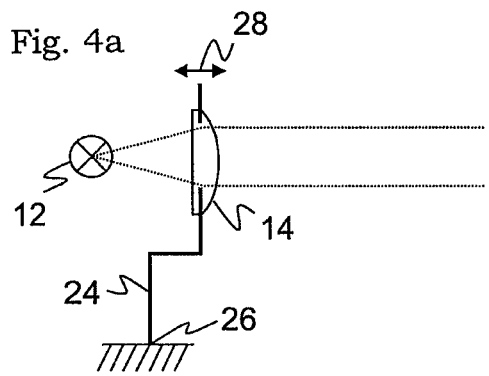
Figure 4B:
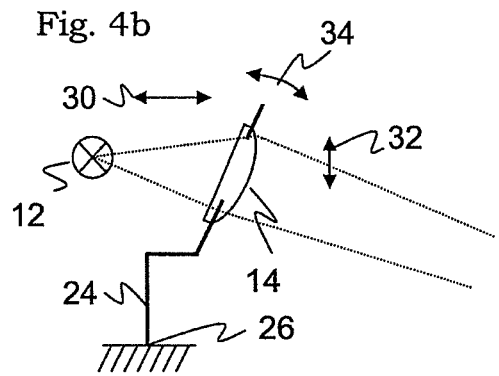
Figure 5:
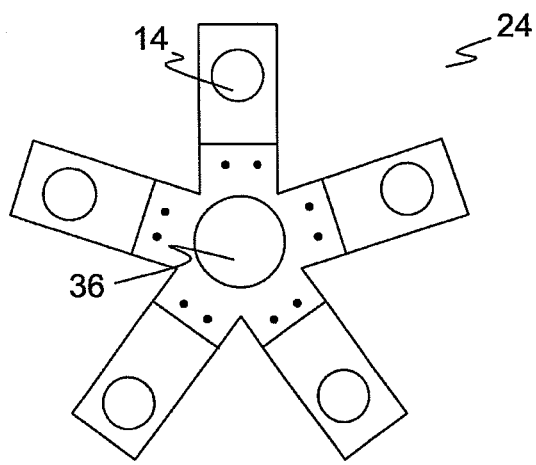
Figure 6A:
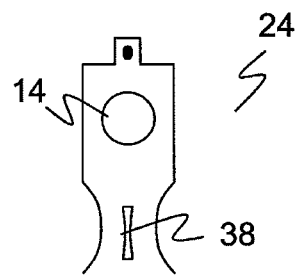
Figure 6B:
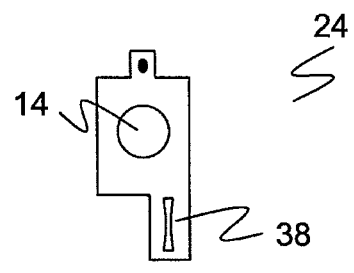
Figure 7A:
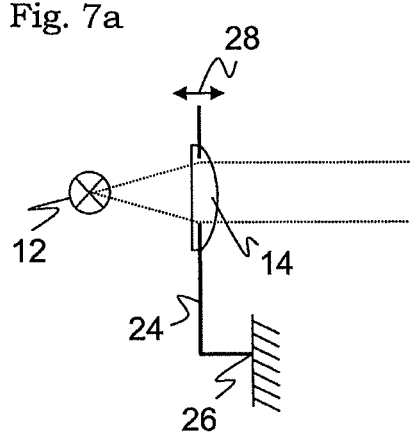
Figure 7B:
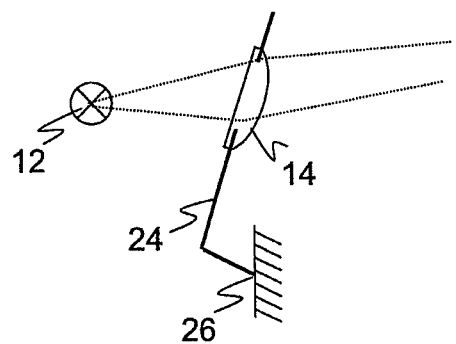
Figure 8A:
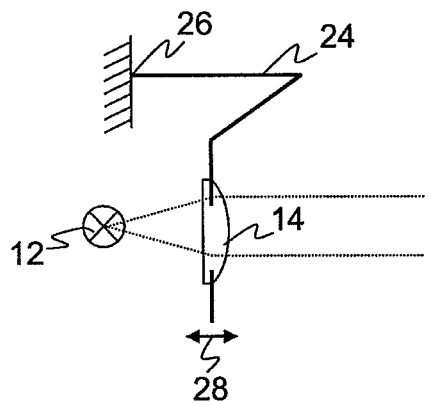
Figure 8B:
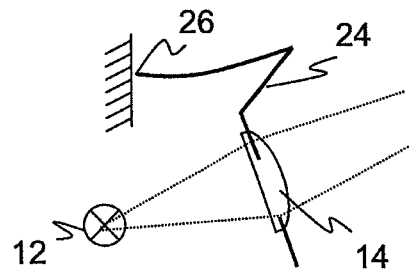
Figure 9A:
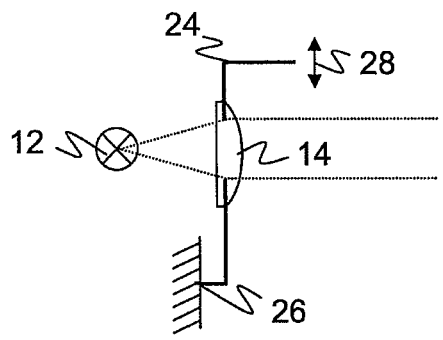
Figure 9B:
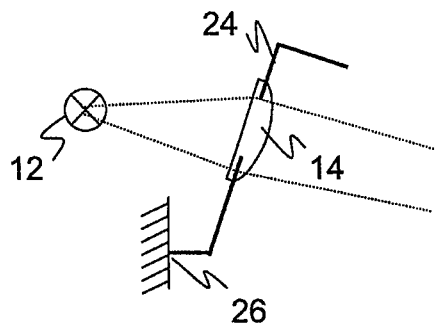
Figure 10A:
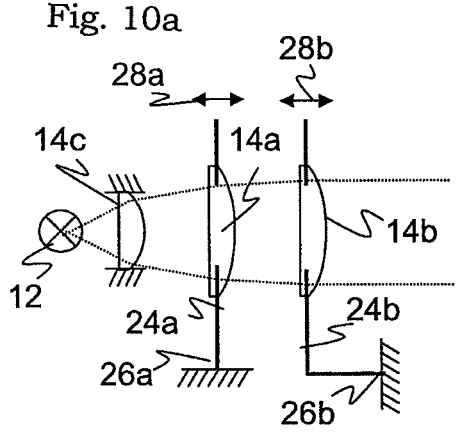
Figure 10B:
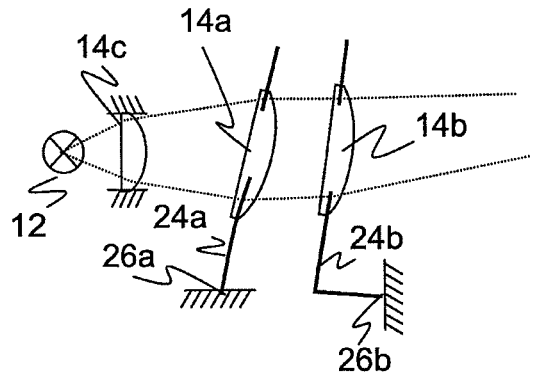
Figure 11:
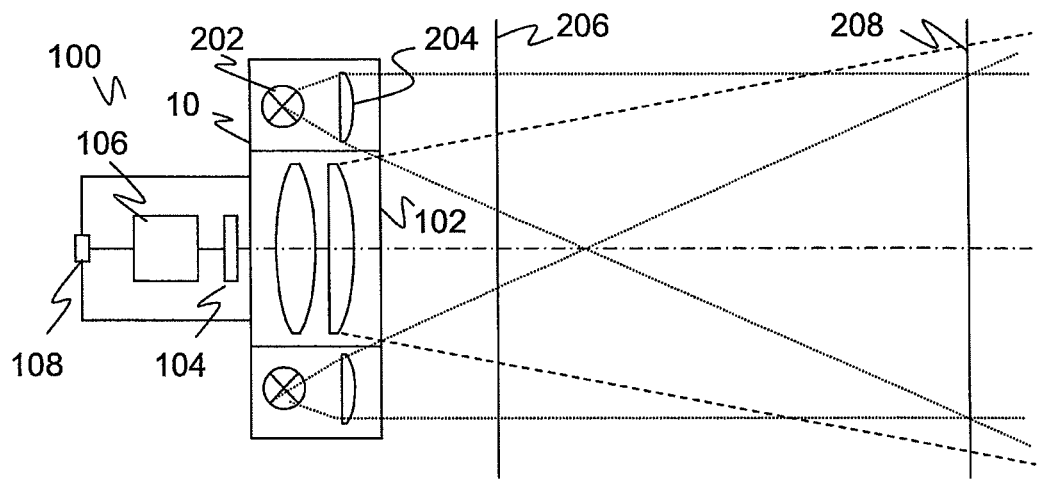
Figure 12:
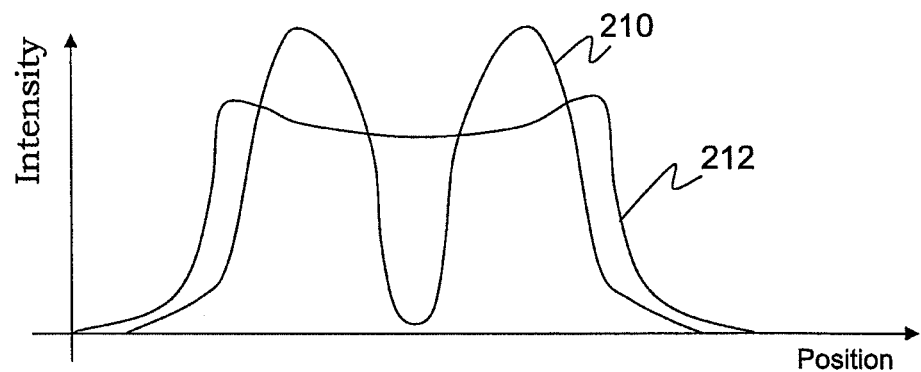

The invention will be explained in more detail in the following, also with respect to further features and advantages by way of example by means of embodiments and with reference to the attached drawing. The illustrations of the drawing show:

FIG. 1 a sectional illustration of a camera-based code reader whose illumination is set to a far working distance;

FIG. 2 a sectional illustration of a camera-based code reader whose illumination is set to a near working distance;

FIG. 3 a position dependent intensity extent of the illumination for the two settings in accordance with FIGS. 1 and 2;

FIG. 4a an illustration of an illumination apparatus of which only one lens and one holder which are fixed at a point of fixation are schematically shown for reasons of simplicity;

FIG. 4b an illustration in accordance with FIG. 4a in an adjustable working distance;

FIG. 5 a top view onto a holder of star-like design;

FIG. 6a a detailed view of a variant of a holder of star-like design having a flexible part region arranged centrally in a ray of a star;

FIG. 6b a detailed view of a further variant of a holder of star-like design having a flexible part region arranged offset in a ray of a star;

FIG. 7a an illustration in accordance with FIG. 4 of a further embodiment of an illumination apparatus of which only one lens and one holder which are fixed at a point of fixation are schematically shown for reasons of simplicity having a changed position and orientation of the connection at the point of fixation;

FIG. 7b an illustration in accordance with FIG. 7a in an adjusted working distance;

FIG. 8a an illustration similar to FIG. 4 of a further embodiment of an illumination apparatus of which only one lens and one object holder which are fixed at a point of fixation are schematically shown for reason of simplicity having a changed shape of the holder;

FIG. 8b an illustration in accordance with FIG. 8a in an adjusted working distance;

FIG. 9a an illustration similar to FIG. 4 of a further embodiment of an illumination apparatus of which only one lens and one holder which are fixed at a point of fixation are schematically shown for reasons of simplicity having a changed engagement direction of a setting device;

FIG. 9b an illustration in accordance with FIG. 9a in an adjusted working distance;

FIG. 10a an illustration of an illumination apparatus of which only one lens and one holder which are fixed at a respective point of fixation are shown for reasons of simplicity;

FIG. 10b an illustration in accordance with FIG. 10a in an adjusted working distance;

FIG. 11 a sectional illustration of a camera-based code reader having an illumination in accordance with the state of the art; and FIG. 12 a position-dependent intensity extent of the illumination of the common code reader in accordance with FIG. 11 in two different settings of the working distance.

FIG. 11 initially shows a sectional illustration of a camera-based code reader 100 having an illumination in accordance with the state of the art. The code reader 100 has an optical reception system 102 illustrated purely by way of example as two lenses in order to image a non-illustrated code in a defined manner at an image sensor 104. Image data of the code are then guided to an evaluation unit 106 which extracts the code information therefrom. The code information, and also, for example the raw image data, parametrizations or status information, can be exchanged via an interface 108.

The code reader 100 comprises a common illumination apparatus 200 having a plurality of light transmitters 202 arranged ring-like about the optical reception system 102. The light transmitters are fixedly associated with an optical transmission system 204 illustrated by a single lens. Lenses 206 and 208 indicated for the purpose of illustration cut the optical path of the illumination apparatus 200 in a first near working distance and/or in a far second working distance.

FIG. 12 shows position-dependent intensity extents 210 and 212 of the illumination in the first and/or second working distance referred to by the lines 206 and 208. The intensity extent 212 confirms a very homogeneous energy distribution at an object to be detected by the code reader 100 in the far second working distance. In contrast thereto the intensity extent 210 shows a generally unusable illumination in the near first working distance due to a lack of adaptation.

The FIGS. 1 to 3 show an analog situation for a camera-based code reader 100 having an adaptable illumination apparatus 10. The reception side of the code reader 100 having an optical reception system 102, an image sensor 104, an evaluation unit 106 and an interface 108 correspond to the common assembly of FIG. 11. The invention will be described with reference to such a camera-based code reader 100. The illumination apparatus 10 can, however, likewise be used for different cameras having an own illumination. Also the illumination is not limited to a ring-like illumination shown in FIG. 1.

In the illumination apparatus 10 a plurality of light transmitters 12, for example, two to ten or even more light transmitters 12, are arranged in a ring-like manner. For example, LEDs serve as light sources of the light transmitter 16. Optical elements of an optical illumination system, or optical transmission system 14 illustrated as lenses, are associated with the light transmitters 12. Instead of lenses also different refractive, reflexive or diffractive optical beam formation elements can be used. An illustrated lens can also represent a lens composed of a plurality of optical elements. Furthermore, it is plausible that a non-illustrated, position-fixed optical beam formation system is additionally associated with the light transmitter 12.

FIG. 1 shows the optical transmission system 14 and in this way the illumination apparatus 10 in a first setting at a far working distance which is illustrated by a line 16. In contrast to this, FIG. 2 shows a second setting at a near working distance illustrated by a line 18, wherein a holder, described in more detail in connection with the FIGS. 4 to 10, ensures that the optical transmission system 14 held by the holder is adjusted. FIG. 2 indicates this merely by tilted lenses or a tilted optical transmission system 14.

FIG. 3 shows position-dependent intensity extents 20 and 22 of the illumination with the working distances being referred to by the lines 16 and 18. Indeed the energy is distributed over a small region in the near working distance, so that the intensity extent 20 remains higher and narrower. Both intensity extents 20 and 22, however, show a very good homogeneity and therefore provide, in contrast to the intensity extents 208, 210 of the common fixed illumination apparatus 200 in accordance with FIG. 12, suitable illumination conditions for a reliable object determination and code detection in the selected working distance. Furthermore, through a corresponding control of the brightness of the transmission elements a constant illumination strength over the spacing can also be achieved as required.

FIG. 4 schematically shows a light transmitter 12 and a lens as an associated optical transmission system 14, as it could be a part of the illumination apparatus 10 or of a different illumination apparatus, for example not configured as a ring. The optical transmission system 14 is held by a holder 24 only schematically illustrated in section which holder is fixed at its point of fixation 26. A manual or automatic setting apparatus 28 which is only illustrated respectively in the Figures by an arrow in its effective direction displaces the holder 24. Since the holder 24 does not move at the point of fixation 26 setting movements of the setting device 28 typically bring about an elastic deformation of the holder 24. FIG. 4a shows a starting position in which the optical transmission system 14 is aligned straight and is almost present at the light transmitter 12. In contrast to this in FIG. 4b the setting device 28 has adjusted the light transmitter 12, as indicated by an arrow 30, along the optical axis. Due to the fixation at the point of fixation 26, however, the holder 24 cannot simply follow this movement, but deflects the optical transmission system 14 in a compulsory guided manner also in a transverse direction to the optical axis, as indicated by an arrow 32. Thus, a positioning of the optical transmission system 14 takes place at the same time in two degrees of freedom. At the same time the kind of fixation of the holder 24 and of the optical transmission system 14 in the shown example also brings about a tilting of the optical transmission system 14. Through a non-shown alternative design of the holder 24, for example in the form of a parallel guidance, a tilting can also be avoided.

The fixation of the holder 24 at the point of fixation, thus brings about a displacement of the optical transmission system 14 in several degrees of freedom albeit a simpler setting movement, so that through the movement of only very small masses a particularly large displacement range is implemented. In this way the illumination is adjusted quickly and simply to the working distance and illuminates the object to be detected in a desired manner, for example, homogeneously as shown in FIG. 3.

FIG. 5 shows the holder 24 in a top view in a star-like embodiment. Respective lenses of the optical transmission system 14 are arranged in the rays of the star. At the center an opening 36 for the optical reception system 102 is present. This holder 24 can preferably be configured as a lens sheet metal into which the lenses are directly injected as an optical transmission system 14. The sheet metal geometry is respectively determined by the boundary conditions of the required illumination scenarios and permits all necessary design and movement degrees of freedom. Also a holder 24 as an injection molded part is possible. In this connection the support positions and bending positions are, for example, designed by tapered portions or reinforced portions so that the holder 24 supports the desired adjustment properties.

This star-like embodiment is an example for a ring illumination, in which the light transmitters 12 are distributed in a ring-like manner and preferably uniformly around the optical reception system 102, said optical reception system being associated with a respective optical transmission system 14, in the present example shown in an exemplary manner in the form of like simple lenses. The star-like holder 24 is fixed at an inner circumference, i.e. at the opening 36 or at its outer circumference in this case at the ends of the rays, at a housing, or at a different position fixed element with respect to the light transmitter 12. The setting device 28 correspondingly engages at the outer or inner circumference, where the holder 24 is non-stationary or not fixed in its position. On actuation of the setting device 28 the rays then bend and the inner region then moves relative to the outer region, wherein the optical transmission system 14 is positioned and tilted in the desired manner.

FIG. 6 shows a detailed view of a ray of the star-like holder 24. Alternatively, the illustration can, however, also be considered as an own illumination apparatus having only a single light source 12 and an optical transmission system 14 or as a part of a different holder 24 different from a star-like holder. A flexible part region 38 is present in the ray illustrated by way of example in the vicinity of the start of the ray. On actuation of the setting device 28 the deformation is then generally or even as good as solely brought about by the flexible part region 38. In the embodiment in accordance with FIG. 6a the flexible part region 38 is arranged centrally, in contrast to this, in the embodiment in accordance with FIG. 6b, the flexible part region 38 is offset. In an analog manner the bending can also be distributed not only at one but over several preferred positions.

The FIGS. 7 to 9 show alternatives to the embodiment in accordance with FIG. 4 with respect to the geometry of the holder 24, the position of the point of fixation 26 and the orientation of the holder at the connection points to the point of fixation 26 as well as with respect to the operating direction of the setting device 28. In the embodiment in accordance with FIG. 7 the connection of the holder 24 to the point of fixation 26 is orthogonal with respect to FIG. 4, whereby the shaping of the holder 24 can be selected more simple. In the embodiment in accordance with FIG. 8 further bending positions are additionally provided in section at the holder 24 in order to support the deformability and to change the movement behavior on deformation. In the embodiment in accordance with FIG. 9 the setting device 28 engages at the holder 24 at a side lying opposite of the point of fixation 26 when considered from the optical transmission system 14 and now acts perpendicular to the optical axis of the light transmitter rather than along the optical axis. This is only a selection of exemplary design possibilities which, in particular can also be combined with one another.

FIG. 10 shows a further embodiment of the optical transmission system 14 and of the holder 24. In this connection the optical transmission system 14 and the holder 24a-b are respectively of multi-part design. Initially a position-fixed lens 14c is present in front of the light transmitter 12. Downstream thereof a first holder 24a and a second holder 24b follow, each having an additional lens 14a-b. Instead of lenses 14a-c also different refractive, reflexive, diffractive or holographic optical elements can be used. The lenses 14a-c together form the optical transmission system 14. Both holders 24a-b can be changed in their position by a respective setting device 28a-b and are respectively fixed at a point of fixation 26a-b. Each holder 24a-b having its lens 14a-b and setting device 28a-b thus behaves in complete correspondence like an individual holder 24 explained by way of example with reference to the FIGS. 4, 7, 8 and 9 and also all variants and combinations of designing the holder 24a-b and deviating from the illustration in accordance with FIG. 10 are possible. Likewise it is plausible that at least one of the holders 24a-b cannot be adjusted without fixation at a point of fixation 26a-b, can only be adjusted along the optical axis or that a setting device 26a-b simultaneously acts on a plurality of holders 24a-b. The holders 24a-b can, for example, in correspondence with FIGS. 5 and 6, be of star-like design and/or be provided with flexible part regions 38.

Through the consecutive placement of a plurality of optical elements behind one another an even larger degree of freedom with regard to the design of the optical transmission system 14 as well as their position-dependent adaptation is possible. In this way also particularly demanding illumination scenarios can be served.

What is claimed is:

1. An illumination apparatus (10) for generating an illuminated region for a camera-based code reader (100) which comprises at least one light transmitter (12), an optical transmission system (14), a holder (24) for the optical transmission system (14) and a setting device (28) by means of which setting device (24) the holder (24) can be moved whereby the illuminated region can be focused at a working distance and/or be adapted in its dimensions,
    wherein the holder (24) is fixed at at least one point of fixation (26) so that the holder (24) is moved in a compulsory guided manner on actuation of the setting device (28) relative to the light transmitter (12), however, maintains its relative position with respect to the light transmitter (12) at the point of fixation (26),
    wherein the setting device (28) is configured to move the holder (24) along the optical axis of the light transmitter (12), and
    wherein the optical transmission system (14) can simultaneously be moved and/or tilted transverse to the optical axis on such a movement by the fixation at the point of fixation (26).

2. An illumination apparatus (10) in accordance with claim 1, wherein the optical transmission system (14) having the holder (24) is of one piece design.

3. An illumination apparatus (10) in accordance with claim 2, wherein lenses are injected into the holder (24).

4. An illumination apparatus (10) in accordance with claim 1, wherein the holder (24) is configured as an injection molded part or as sheet metal.

5. An illumination apparatus (10) in accordance with claim 4, wherein the sheet metal is lens sheet metal.

6. An illumination apparatus (10) in accordance with claim 4, wherein the holder (24) is of star-like design and respectively has at least one optical element of the optical transmission system (14) in the rays of a star.

7. An illumination apparatus (10) in accordance with claim 6 wherein the holder (24) comprises at least one flexible part region (38) which can be elastically deformed through an actuation of the setting device (28), with a respective flexible part region (38) being arranged centrally or laterally offset in the rays of the star.

8. An illumination apparatus (10) in accordance with claim 1, further comprising a plurality of light transmitters (12) and wherein the optical transmission system (14) comprises a plurality of lenses associated with the light transmitter (12).

9. An illumination apparatus (10) in accordance with claim 8, wherein the plurality of lenses is a plurality of like lenses.

10. An illumination apparatus (10) in accordance with claim 8, which is configured as a ring illumination in which the light transmitters (12) are distributed in a ring-like manner about its circumference.

11. An illumination apparatus (10) in accordance with claim 10, wherein the holder (24) is fixed at its outer circumferential region and can be moved in an inner region by the setting device (28) or vice versa.

12. An illumination apparatus (10) in accordance with claim 1, wherein the holder (24) comprises at least one flexible part region (38) which can be elastically deformed through an actuation of the setting device (28).

13. An illumination apparatus (10) in accordance with claim 1, which comprises at least two holders (24a-b) having a respective optical transmission system (14a-b).

14. An illumination apparatus (10) in accordance with claim 1, wherein the setting device (28) has one of a manual actuation and an electronically controllable actor.

15. A camera-based code reader (100) having an illumination apparatus (10), said illumination apparatus comprising at least one light transmitter (12), an optical transmission system (14), a holder (24) for the optical transmission system (14) and a setting device (28) by means of which setting device (24) the holder (24) can be moved whereby the illuminated region can be focused at a working distance and/or be adapted in its dimensions, with the holder (24) being fixed at at least one point of fixation (26) so that the holder (24) is moved in a compulsory guided manner on actuation of the setting device (28) relative to the light transmitter (12), however, maintains its relative position with respect to the light transmitter (12) at the point of fixation (26), said camera based code reader having an image sensor (104) and an evaluation unit (106) which is configured to read out a code information of a code recorded in image data taken by the image sensor (104) and to output the code information,.

wherein the setting device (28) is configured to move the holder (24) along the optical axis of the light transmitter (12), and wherein the optical transmission system (14) can simultaneously be moved and/or tilted transverse to the optical axis on such a movement by the fixation at the point of fixation (26).

16. A camera-based code reader (100) in accordance with claim 15, wherein the setting device (28) has a coupling to a focusing device for an optical reception system (102) of the image sensor (104).

17. A method for generating an illuminated region for a camera-based code reader (100), wherein a holder (24) for optical transmission system (14) of a light transmitter (12) is moved whereby the illuminated region is focused at a working distance and/or is adapted in its dimensions, wherein the holder (24) fixed at at least one point of fixation (26) is moved in a compulsory guided manner relative to the light transmitter (12) and in this connection maintains its relative position with regard to the light transmitter at the point of fixation (26), wherein a setting device (28) moves the holder (24) along the optical axis of the light transmitter (12), and wherein the optical transmission system (14) simultaneously moves and/or tilts transverse to the optical axis on such a movement by the fixation at the point of fixation (26).

* * * * *